United States Patent
Green

(10) Patent No.: US 11,230,897 B2
(45) Date of Patent: Jan. 25, 2022

(54) SYSTEM AND METHOD FOR INTELLIGENT FLOW CONTROL SYSTEM FOR PRODUCTION CEMENTING RETURNS

(71) Applicant: SPM Oil & Gas PC LLC, Fort Worth, TX (US)

(72) Inventor: Matthew Brady Green, Norman, OK (US)

(73) Assignee: SPM Oil & Gas PC LLC, Fort Worth, TX (US)

( * ) Notice: Subject to any disclaimer, the term of this patent is extended or adjusted under 35 U.S.C. 154(b) by 267 days.

(21) Appl. No.: 16/137,515

(22) Filed: Sep. 20, 2018

(65) Prior Publication Data

US 2019/0093435 A1     Mar. 28, 2019

Related U.S. Application Data

(60) Provisional application No. 62/561,908, filed on Sep. 22, 2017.

(51) Int. Cl.

| | |
|---|---|
| E21B 21/06 | (2006.01) |
| E21B 47/06 | (2012.01) |
| E21B 21/10 | (2006.01) |
| E21B 33/14 | (2006.01) |
| E21B 21/08 | (2006.01) |
| G01F 1/05 | (2006.01) |
| E21B 47/10 | (2012.01) |

(52) U.S. Cl.
CPC .......... *E21B 21/067* (2013.01); *E21B 21/08* (2013.01); *E21B 21/10* (2013.01); *E21B 33/14* (2013.01); *E21B 47/06* (2013.01); *E21B 47/10* (2013.01); *G01F 1/05* (2013.01)

(58) Field of Classification Search
CPC .............................. E21B 21/067; E21B 33/14
See application file for complete search history.

(56) References Cited

U.S. PATENT DOCUMENTS

| | | | | |
|---|---|---|---|---|
| 2,341,169 A | * | 2/1944 | Wilson | E21B 21/067 73/152.04 |
| 2,748,884 A | * | 6/1956 | Erwin | E21B 21/067 96/198 |
| 3,325,974 A | * | 6/1967 | Griffin, III | E21B 21/067 96/162 |

(Continued)

*Primary Examiner* — Blake E Michener
(74) *Attorney, Agent, or Firm* — Wei Wei Jeang; Grable Martin Fulton PLLC

(57) ABSTRACT

A system and method of controlling and monitoring a cementing process injecting a cement slurry down a well that causes a return of a drilling fluid includes a first and second flowmeters disposed in the primary return conduit configured to generate a flow rate measurements of the returned drilling fluid, a first control valve receiving control signals from a microprocessor to regulate conducting the returned drilling fluid to a reservoir, a choke valve disposed downstream from the first and second flowmeters receiving control signals from a microprocessor to regulate diverting the returned drilling fluid in the primary return conduit in response to a detection of the presence of gas in the returned drilling fluid, and a mud-gas separator disposed in the primary return conduit configured to receive the diverted drilling fluid and separate the diverted drilling fluid into a mud component for return to the reservoir and a gas component for controlled burn off.

15 Claims, 2 Drawing Sheets

(56) References Cited

U.S. PATENT DOCUMENTS

| | | | | |
|---|---|---|---|---|
| 3,633,687 | A | * | 1/1972 | West .................. E21B 21/08 175/48 |
| 4,635,735 | A | * | 1/1987 | Crownover .......... E21B 21/067 175/42 |
| 5,327,969 | A | * | 7/1994 | Sabins ................ C04B 40/00 166/250.14 |
| 5,339,899 | A | * | 8/1994 | Ravi .................. E21B 21/08 166/185 |
| 10,718,172 | B2 | * | 7/2020 | Thow .................. E21B 47/06 |
| 2004/0265176 | A1 | * | 12/2004 | Kerherve ............ B01D 19/0005 422/68.1 |
| 2008/0060846 | A1 | * | 3/2008 | Belcher .............. E21B 43/08 175/25 |
| 2011/0094736 | A1 | * | 4/2011 | Evrard ................ E21B 21/067 166/267 |
| 2011/0303463 | A1 | * | 12/2011 | Lessi ................. E21B 21/067 175/50 |
| 2013/0118752 | A1 | * | 5/2013 | Hannegan ............ E21B 33/143 166/336 |
| 2016/0290131 | A1 | * | 10/2016 | Mitchell ............. E21B 49/087 |
| 2017/0107773 | A1 | * | 4/2017 | Shekhar .............. E21B 21/08 |
| 2017/0227387 | A1 | * | 8/2017 | Fenn .................. G01F 1/007 |
| 2017/0370167 | A1 | * | 12/2017 | Aktas ................. G01F 23/2967 |
| 2018/0135367 | A1 | * | 5/2018 | Thow ................. E21B 47/06 |
| 2018/0245466 | A1 | * | 8/2018 | Gosney ............... E21B 49/086 |
| 2018/0328173 | A1 | * | 11/2018 | Young ................ E21B 21/067 |
| 2018/0363414 | A1 | * | 12/2018 | Bogaerts ............. E21B 47/06 |

* cited by examiner

SYSTEM AND METHOD FOR INTELLIGENT FLOW CONTROL SYSTEM FOR PRODUCTION CEMENTING RETURNS

RELATED APPLICATION

The present application claims the benefit of U.S. Provisional Patent Application No. 62/561,908 filed on Sep. 22, 2017, incorporated herein by reference.

FIELD

The present disclosure relates to fluid flow control systems and methods, and in particular, to a system and method for intelligent flow control and monitoring during production cementing returns.

BACKGROUND

In oil and gas production, cement is used to hold the casing in place and to prevent fluid migration between subsurface formations. "Cementing," one of the most critical steps, is the process of pumping a slurry of cement, cement additives, and water down through the casing to critical points in the annulus around the casing or in the open hole below the casing string. The cement slurry flows to the bottom of the wellbore through the well casing and displaces the drilling fluids still located within the well and allows the drilling fluids to come back up the well. The cement slurry flows to the bottom of the wellbore through the casing, which will eventually be the pipe through which the hydrocarbons flow to the surface. From there it fills in the space between the casing and the actual wellbore and hardens. This creates a seal so that outside materials cannot enter the well flow, as well as permanently positions the casing in place. Cementing achieves many objectives: it provides a hydraulic seal, creates zonal isolation, protects the environment, provides structural support for the casing, protects the casing from corrosion, and isolates the casing seat for subsequent drilling.

A gas kick is an unscheduled and unwanted entry of gas into the wellbore, which travels up the well and rapidly expands due to change in atmosphere pressure in an uncontrolled fashion. Serious consequences of a gas kick include unsafe conditions for operators where return gas or kick gas has the potential to reach an ignition source, or be released to the atmosphere in an uncontrolled manner in a blowout.

DETAILED DESCRIPTION

Figure 1:
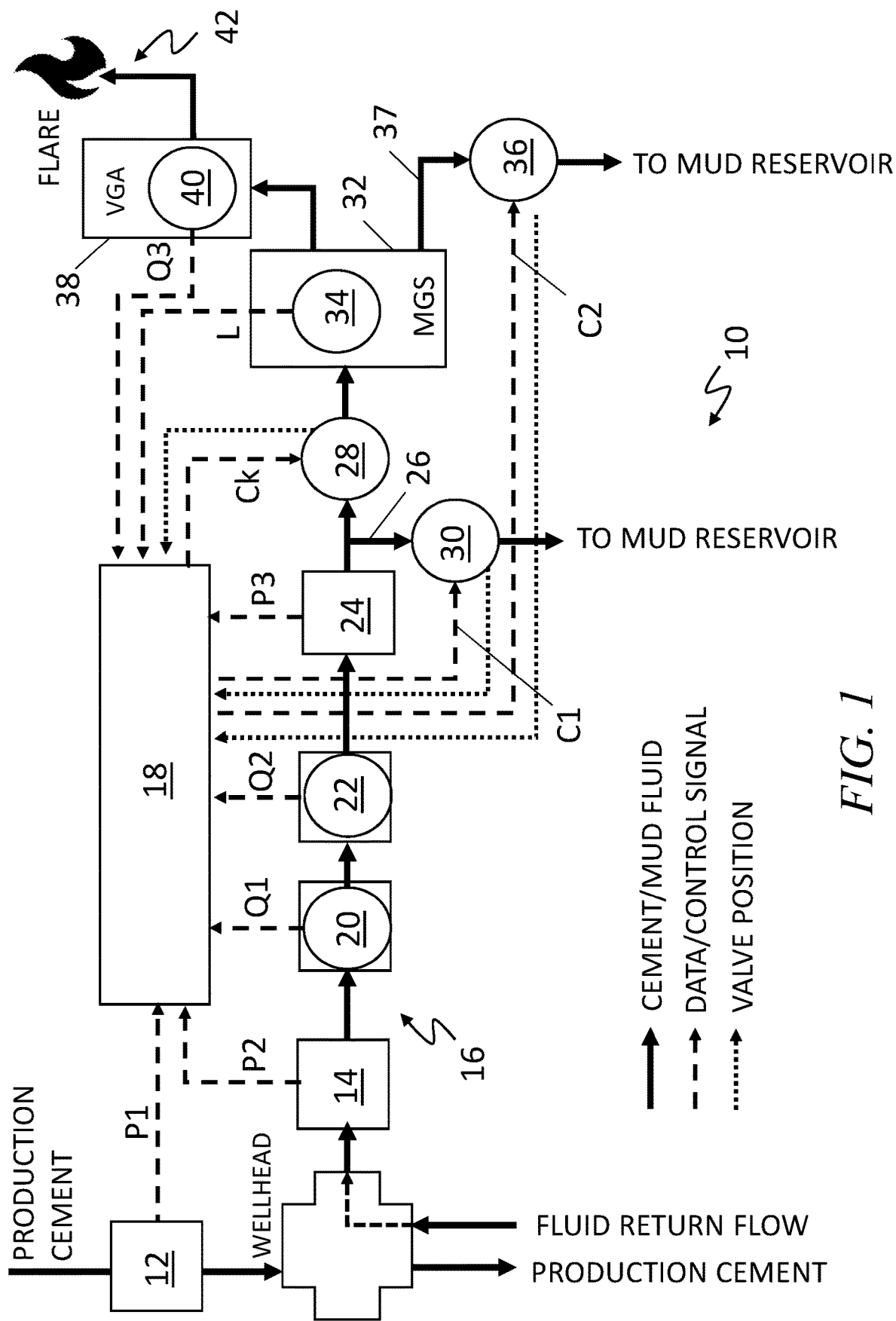
FIG. 1 is a diagram of an exemplary system for controlling and monitoring wellbore fluid flow out of a wellhead during production cementing operations according to the teachings of the present disclosure.

FIG. 1 is a diagram of an exemplary system and method 10 for controlling and monitoring wellbore fluid flow out of a wellhead during production cementing operations according to the teachings of the present disclosure. As shown in FIG. 1, during cementing operations, production cement slurry is introduced and pumped down into a wellhead between the wellbore and the casing, and the cement slurry displaces the drilling mud or fluid in the well and pushes it back up through the casing. The system and method 10 described herein are used to monitor the mud fluid that is returned back up the well to the drilling mud system. The system 10 includes a pressure sensor 12 that measures the fluid pressure (P1) of the inbound cement flurry, and a second pressure sensor 14 that measures the fluid pressure (P2) of the drilling fluid return flow in the primary return conduit 16. Additional pressure sensors may be used in addition to sensors 12 and 14 to provide for redundancy and backup. The sensed pressure measurements (P1 and P2) are transmitted or relayed, via wired or wireless communication, to an intelligent controller 18 where the information is used to monitor the cementing operation. For example, a rapidly rising pressure reading in P2 may indicate the presence of expanding gases in the return flow.

Downstream from the second pressure sensor 14 are one or more flowmeters 20 and 22 used to measure the return flow rate. Because the return flow may include a mixture of gas and liquids, flowmeters 20 and 22 preferably measure flow rate based on different principles/technology. For example, flowmeter 20 can be of type "A," including wedge, ultrasonic, venturi, etc. Flowmeter 22 can be of type "B," including Coriolis, wedge, venturi, etc. Because the Coriolis flowmeter is capable of providing the density of the flow in addition to mass flow rate, its output is highly accurate regardless of the gas and liquid composition of the flow. However, because of its sensitivity and the harsh operating environment at a well site, a secondary flowmeter provides redundancy and enables a flow rate measurement comparison. Due to the high cost of Coriolis flowmeters, another embodiment may include using two flowmeters where one is best suited for measuring gas flow rate and the other most accurate for measuring liquid flow rate. The sensed flow rates (Q1 and Q2) from the flowmeters 20 and 22 are also transmitted or relayed to the intelligent controller 18, where the flow rates are compared to determine the gas/liquid composition in the return flow. For example, if the differential between flow rates Q1 and Q2 has been relatively constant but is now experiencing a smaller or larger delta, this may indicate a composition change in the return flow and potentially the presence of gas in the slurry.

Further downstream is a pressure sensor 24 that provides a fluid pressure measurement (P3) to the intelligent controller 18. Additional pressure sensors may be used to provide backup and redundancy. The measurements P2 and P3 provide a pressure differential across the flowmeters 20 and 22. For example, a pressure drop above a certain threshold may indicate disruption in the flow that may require maintenance and attention. A first return conduit 26 is coupled to the primary return conduit 16 that guides the drilling fluid back to a reservoir of the drilling mud system. Because the choke valve 28 disposed in the primary return conduit 16, under remote control signal (Ck), is normally closed, the returned flow of mud is guided to the drilling mud system via the first return conduit 26. A control valve 30, under manual or remote control (C1), is disposed in the first return conduit 26 to guide the flow of the returned drilling fluid to a drilling mud reservoir (not explicitly shown). The choke valve 28 may be manual, electric-actuated, hydraulic-actuated, electro-hydraulic actuated, electric-over-hydraulic actuated, as known in the art or to be developed. However, if the presence of gas or a "kick" situation is detected in the returned flow by evaluating flow rates Q1 and Q2, for example, the control valve 30 is immediately closed and the choke valve 28 is immediately opened to divert the return flow away from the first return conduit 26 and instead provided to a mud-gas separator (MGS) 32 downstream for processing.

The mud-gas separator 32 is equipment used to separate and capture gas from the drilling fluid. Any type of mud-gas separator as known in the art may be used. The mud-gas separator 32 may include a level sensor 34 to provide a liquid level measurement, L, which is transmitted or relayed to the intelligent controller 18. The separator 32 may also include a discharge control valve 36 disposed in the separator discharge conduit 37 to the drilling mud reservoir. The discharge control valve 36 may be manually or remotely actuated based on measured liquid level and liquid level rate-of-change within the separator 32. If the level, L, indicates that the level of liquids is below a certain threshold and/or dropping rapidly, the control valve 36 is shut off completely or partially to temporarily stop or slow down the flow of mud to the reservoir to prevent the separated gas in the mud-gas separator to escape to the drilling mud system via the separator discharge conduit 37. Once the level of the mud within the separator rises, the discharge control valve 36 is reopened to continue to return the drilling mud to the reservoir. As shown in FIG. 1, the intelligent controller 18 is configured to also receive the position of the control valves and choke valve so that it is aware of the open/shut states of these valves at all times.

The mud-gas separator 32 may be a two-phase or three-phase separator configured to separate gas materials from fluid flow, and to separate other materials, such as oil, sand, etc. from the fluid flow. The separated gas may be fed to a vent gas analyzer 38 that provides real-time information about the separated gas, including the gas flow rate measured by a flowmeter 40, total gas volume over a certain time period, and gas composition. The vent gas analyzer 38 monitors the methane gas concentration in the vent gas stream by measuring the total flow rate and calculating the methane gas flow rate (Q3). The separated gas can be ignited and burned off in a controlled manner in a flare stack 42. The vent gas analyzer 38 ay also monitor hydrogen sulfide gas concentration in the vent gas stream. If hydrogen sulfide is present in high enough concentrations, the system would initiate visible and audible alarms for this safety concern.

Figure 2:
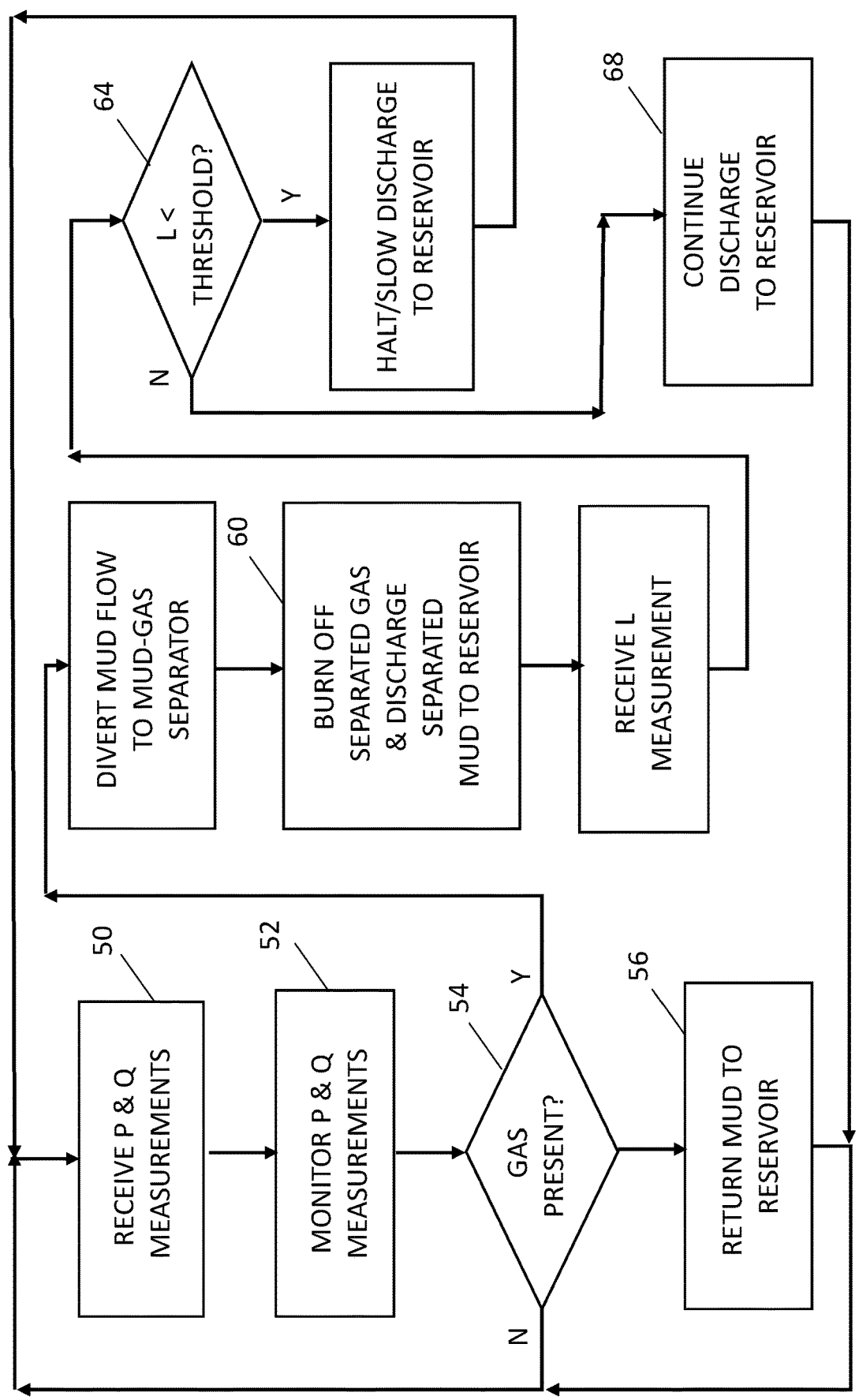
FIG. 2 is a flowchart of an exemplary embodiment of a method for controlling and monitoring wellbore fluid flow out of a wellhead during production cementing operations according to the teachings of the present disclosure.

FIG. 2 is a flowchart of an exemplary embodiment of a method for controlling and monitoring wellbore fluid flow out of a wellhead during production cementing operations according to the teachings of the present disclosure. In step 50, the intelligent controller 18 receives the pressure and flow rate measurements produced by the sensors disposed in the primary return conduit as described above. In step 52, the received pressure and flow rate measurements are monitored and analyzed by the intelligent controller 18. If the analysis indicates that gas is not present in the return flow, as queried in step 54, then execution proceeds to step 56, where the drilling mud is guided to a reservoir via the first return conduit 26. If the analysis indicates that gas is present in the return flow, then the returned drilling mud is diverted to a mud-gas separator 32, which can separate the gas from the liquid in the returned flow. The liquid is then discharged from the mud-gas separator 32 via the second return conduit 37 to the reservoir, as shown in step 60. Further, the gas that was separated from the return flow is provided to a flare stack 42 and burned in a controlled manner. The intelligent controller 18 also receives a liquid level measurement, L, from the mud-gas separator 32. If L drops below a certain threshold, as determined in step 64, then the valve 36 at the discharge conduit 37 is closed to halt the discharge of the return flow to the reservoir. If the liquid level is not below the threshold, then the separated liquid from the mud-gas separator is allowed to continue to be discharge to the reservoir, as shown in step 68, and execution returns to step 50.

In operation, the intelligent controller 18 receives and analyzes the pressure measurements (P1, P2, and P3), flow rates (Q1, Q2, and Q3), and level measurement (L), to control the actuation of valves 28, 30, and 36 (using control signals C1, C2, and CK) to conduct the flow of the returned drilling mud, and to prevent unsafe conditions such as gas kicks from the wellbore causing unsafe conditions at the surface operations. When the presence of gas is detected, the flow of the drilling mud is diverted to a mud-gas separator 34 so that the gas can be captured and supplied to a flare stack in a controlled manner. Users may also access real-time measurement and monitoring data via a data portal and generate operational reports. Local and/or remote users are also alerted in real-time when operating parameters exceed certain thresholds or when operator attention is needed.

The intelligent controller 18 includes a microprocessor executing software code that analyzes the sensor measurements (P, Q, and L), and wireless and wired data transmission interfaces now known or to be developed for communicating with the sensors, control valves (C1, C2, and Ck), mud-gas separator, and vent gas analyzer, and local computing devices, such as smartphones, notepad computers, RFID devices, as well as remote cloud databases and servers. The intelligent controller 18 may further include user interface devices such as display screen, touch screen, keyboard, and/or keypad.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A system of controlling and monitoring a casing cementing process injecting a cement slurry down a well that causes a return of a drilling fluid at a wellhead, comprising:
   a first pressure sensor configured to measure a first fluid pressure of the cement slurry prior to injection down the casing;
   a second pressure sensor configured to measure a second fluid pressure of the returned drilling fluid in a primary return conduit;
   at least one flowmeter disposed downstream from the second pressure sensor configured to measure a flow rate of the returned drilling fluid;
   a third pressure sensor downstream from the at least one flowmeter configured to measure a third fluid pressure of the returned drilling fluid;
   a first control valve downstream from the third pressure sensor configured to regulate conducting the returned drilling fluid to a reservoir;
   a choke valve downstream from the third pressure sensor configured to regulate diverting the returned drilling fluid in the primary return conduit;
   a mud-gas separator disposed in the primary return conduit downstream from the choke valve configured to receive the diverted drilling fluid and separate into a mud component for return to the reservoir and a gas component for controlled burn off; and a microprocessor configured to receive and analyze the fluid pressure and flow rate measurements, and generate control signals to close the first control valve and open the choke valve in response to detecting presence of gas in the returned drilling fluid.

2. The system of claim 1, further comprising a second control valve configured to regulate conducting the separated mud component from the mud-gas separator to the reservoir.

3. The system of claim 2, wherein the microprocessor is configured to generate a control signal to regulate the second control valve in response to a sensed level of the separated mud component within the mud-gas separator dropping below a threshold.

4. The system of claim 3, wherein the mud-gas separator further measures the fluid levels of the separated mud component within the mud-gas separator, and the microprocessor is configured to control a second control valve configured to regulate conducting the separated mud component from the mud-gas separator to the reservoir.

5. The system of claim 1, further comprising a vent gas analyzer configured to analyze a composition of the separated gas component and determine a flow rate thereof for analysis by the microprocessor.

6. The system of claim 1, wherein the at least one flowmeter comprises first and second flowmeters of different types, where the microprocessor is configured to detect the presence of gas in the returned drilling fluid by analyzing the flow rate measurements from the first and second flowmeters.

7. A system of controlling and monitoring a cementing process injecting a cement slurry down a well casing that causes a return of a drilling fluid in a primary return conduit, comprising:
a first flowmeter disposed in the primary return conduit configured to generate a first flow rate of the returned drilling fluid;
a second flowmeter disposed in the primary return conduit configured to generate a second flow rate of the returned drilling fluid from the well casing;
a first control valve downstream from the first and second flowmeters configured to regulate conducting the returned drilling fluid to a reservoir;
a choke valve disposed downstream from the first and second flowmeters configured to regulate diverting the returned drilling fluid in the primary return conduit;
a mud-gas separator disposed in the primary return conduit downstream from the choke valve configured to receive the diverted drilling fluid and separate the diverted drilling fluid into a mud component for return to the reservoir and a gas component for controlled burn off; and
a microprocessor configured to receive the first and second flow rates, determine a presence of gas in the returned drilling fluid in response to a comparison of the first and second flow rates, and regulate the actuation of the first control valve and choke valve to conduct the drilling fluid to the fluid reservoir in the absence of gas in the drilling fluid, and conduct the drilling fluid to the mud-gas separator in the presence of gas in the drilling fluid.

8. The system of claim 7, further comprising:
a first pressure sensor configured to measure a first fluid pressure of the cement slurry prior to injection down the well;
a second pressure sensor configured to measure a second fluid pressure of the returned drilling fluid in the primary return conduit; and
a third pressure sensor downstream from the first and second flowmeters configured to measure a third fluid pressure of the returned drilling fluid.

9. The system of claim 7, further comprising a vent gas analyzer configured to analyze a composition of the separated gas component and determine a flow rate thereof.

10. The system of claim 7, wherein the first and second flowmeters are of different types, where the microprocessor is configured to detect the presence of gas in the returned drilling fluid by analyzing the flow rate measurements from the first and second flowmeters.

11. A method of controlling and monitoring a cementing process injecting a cement slurry down a well casing that causes a return of a drilling fluid at a wellhead, comprising:
measuring at least two flow rates of the returned drilling fluid;
determining one of absence and presence of gas in the returned drilling fluid by analyzing the at least two flow rates;
controllably conducting the returned drilling fluid to a reservoir in response to a determination of an absence of gas in the returned drilling fluid; and
controllably diverting the returned drilling fluid to a mud-gas separator configured to separate the returned drilling fluid into a mud component for return to the reservoir and a gas component in response to a determination of a presence of gas in the returned drilling fluid.

12. The method of claim 11, further comprising sensing a level of the separated mud component in the mud-gas separator, and regulating the flow of the separated mud component to the reservoir in response to the level dropping below a threshold.

13. The method of claim 11, further comprising analyzing a composition of the separated gas component and determine a flow rate thereof.

14. The method of claim 11, wherein measuring at two flow rates comprises measuring a density of the returned drilling mud to determine absence and presence of gas.

15. The method of claim 11, further comprising:
measuring a first fluid pressure of the cement slurry prior to injection down the well; and
measuring at least one second fluid pressure of the returned drilling fluid.

* * * * *